Patented Apr. 29, 1952

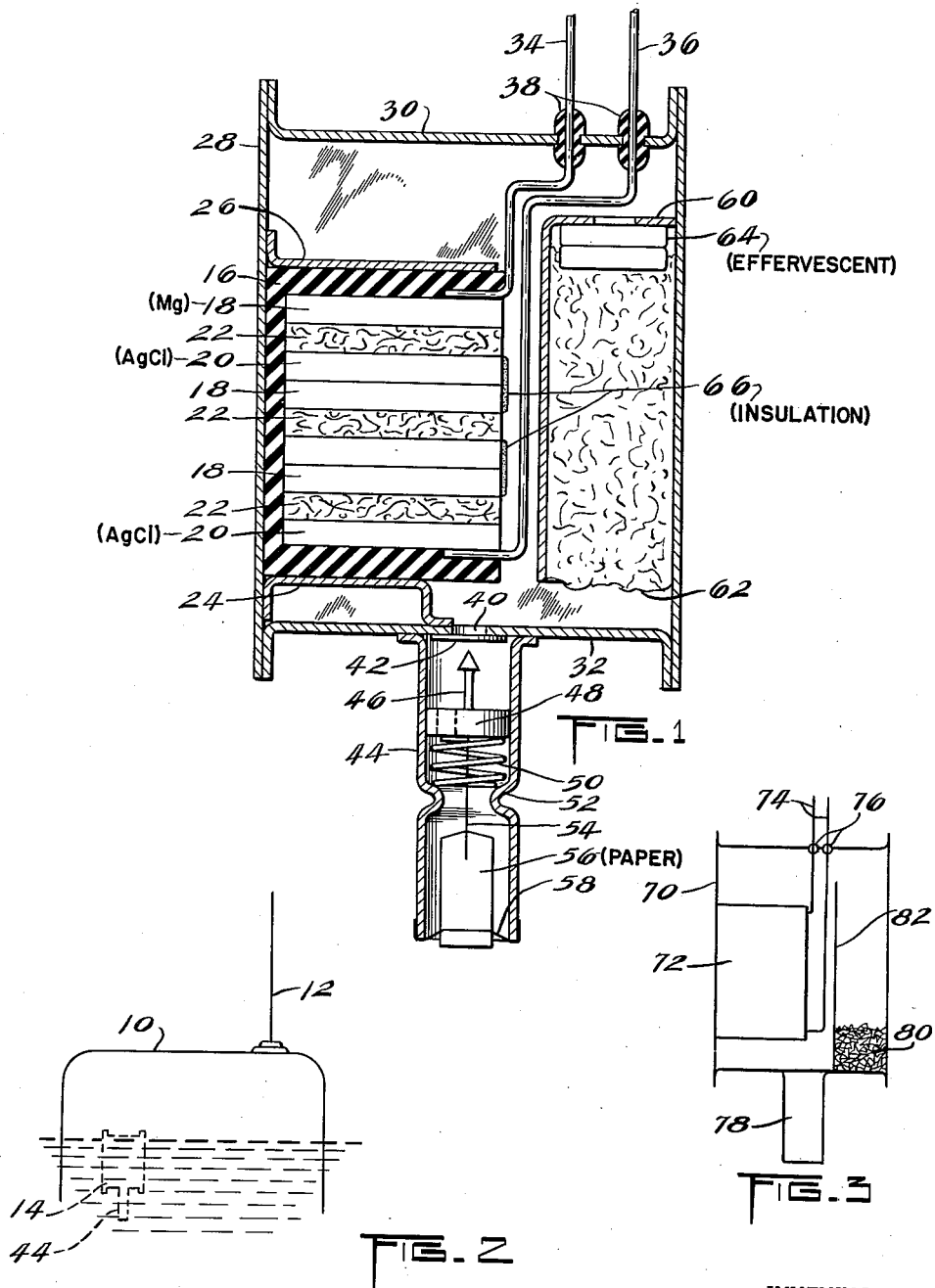

2,594,879

UNITED STATES PATENT OFFICE 2,594,879

DEFERRED-ACTION BATTERY

James N. Davis, Elmont, N. Y., assignor to Sylvania Electric Products Inc., a corporation of Massachusetts Application October 9, 1948, Serial No. 53,674

13 Claims. (Cl. 136—90)

1

The present invention relates to deferred-action batteries, and in particular to a novel battery activation assembly.

The problem of deferred activation of batteries is one of long standing, involving certain problems solved by the present invention. This field of development is illustrated broadly in United States Patent No. 2,441,896, issued to T. G. Moir on May 18, 1948. A deferred-action battery is shown there having plural cells stacked within a case which also encloses a sealed capsule containing electrolyte. Each cell comprises a bibulous layer which has an edge adjacent a channel formed in the battery case, and the electrolyte courses along the channel when the capsule is broken. By special choice of electrolyte effort is made to minimize short-circuit current in the channel bridging all the cells and which contains electrolyte.

One phase of the present invention is concerned with the problem of short-circuiting in deferred-action batteries. Another aspect of the invention provides for automatic activation that is especially useful with highly active batteries designed for quick activation upon immersion in fresh or salt water. The invention will be more fully appreciated and its purposes and various novel features will be better understood from the following detailed disclosure of a specific illustrative embodiment taken with the accompanying drawings in which:

Fig. 1 is a longitudinal section through a deferred-action battery in combination with activation instrumentalities;

Fig. 2 represents a floating radio transmitter containing the deferred-action battery in Fig. 1; and Fig. 3 is a modification of the assembly of Fig. 1.

A radio transmitter 10 having antenna 12 is shown in Fig. 2, proportioned so as to float upright in the position shown. The transmitter carries a deferred-action battery unit 14 with its lower extremity submerged. Transmitter 10 is carried by a vessel to the desired location and dropped into the water, to assume position illustrated. Unit 14 is to furnish the electrical energy for operating the transmitter, and because it has a comparatively short life during which it delivers energy at a relatively high rate, it is to be activated only after contact with the water. Prior to immersion it is to be unaffected by humidity, or by condensation due to rapid changes in atmospheric conditions, but must be capable of quick activation upon contact with the water.

A deferred-action battery unit is shown in

2

Fig. 1 in which a battery case 16 of waterproof insulating material contains electrodes 18 as of magnesium and electrodes 20 as of silver chloride, in pairs spaced apart by bibulous separators 22. This battery is carried on brackets 24 and 26 supported in a sheet-metal container having side wall 28 and end walls 30 and 32. Leads 34 and 36 extend through hermetically sealed insulators 38 in wall 30 to the battery. Lower wall 32 is provided with an aperture 40 sealed over by a thin wafer 42, as of copper.

The battery and its enclosure 28, 30, 32 are intended to be carried upright, as within transmitter 10, and its container is evacuated to about 1 centimeter of mercury. A tube 44 is sealed to wall 32 about aperture 40, and when the wafer 42 is perforated (as will be described) fresh or salt water is drawn into the container via tube 44. The length of this tube can be changed to suit the location of the battery in its supporting unit 10.

In order to perforate wafer 42 the following illustrative arrangement is provided. A barb 46 is carried on the forward end of plug 48 slidably supported within tube 44, urged toward wafer 42 by coil spring 50. This spring reacts against a rib 52 formed in tube 44. Plug 48 is restrained from travel toward wafer 42 by cord 54 adhered with waterproof cement to a strip 56 of paper the opposite end of which is secured to the opening of tube 44 by another cord 58 that also is held to the paper by waterproof cement. The paper is to have a high breaking strength when dry, but a low breaking strength when actually moistened. Any material having these characteristics may be substituted, and a water-soluble link of sugar or the like may also be used with suitable changes in connections. The paper is not adhered directly to the plug 48 and the tube 44 because under some conditions those parts (that are normally of metal) may have moisture condense upon them and the condensation might wet the paper and release barb 46 prematurely. Paper is of low specific heat and consequently has little tendency to condense water out of the air. The puncturing assembly is of little weight and is therefore relatively immune to shock and inertia effects.

When transmitter 10 carrying the assembly in Fig. 1 is immersed, strip 10 promptly breaks and spring 50 drives barb 46 through wafer 42. The head of the barb is enlarged and passes beyond wafer 42, so that clearance is provided for admission of water into the evacuated container; and plug 48 is apertured to provide a water passage. The water rises nearly to the top of the container and soaks into separators 22 for activating the battery. During this process the activity of the battery is comparatively low. A second or more is required before the full activity of the cell is attained. A damaging current would pass between each cell of the battery and the others were the water allowed to remain within the container. To avoid this difficulty a water-activated means for releasing gas into the container is provided for expelling the water. In one form in Fig. 1, a sleeve 60 (forming a compartment communicating to the water-access space about the battery) is secured to the side wall 28 of the container, filled with bibulous material 62 which supports a suitable supply of effervescent pellets 64 that react with water and give off a gas reaction product. Citric acid and sodium bicarbonate is one mixture among many that will evolve gas when moistened; and for this mixture the evolved gas, $CO_2$, is inert. When the gas is generated, it replaces the free liquid within the container, driving it out through aperture 40. Absorbed water remains in the container, and excess gas also leaves via aperture 40. The absorbent material 62 acts to maintain a supply of water in contact with pellets 64 long after the level of the free liquid has dropped below the level of the pellets. The battery can thus be effectively activated upon immersion, without the after-effect of electrical short-circuit through the water.

Even after the free, unabsorbed liquid has been driven out of the container, there may remain a film of water or electrolyte across the exposed edges of the cells. To minimize this condition, the exposed edges of electrodes 18 and 20 and the lateral edges of battery case 16 are advantageously coated with a water-repellent and electrical insulating substance 66 such as zinc borate or amino sylane compounds. This material is not intended to be chemically active, but is used solely for its physical property of repelling surface liquid, thus constituting an electrical surface barrier between cells. The exposed edges of separators 22 are, of course, not coated with the water-repellent substance.

A deferred-action battery assembly is shown in Fig. 3 involving a modified form of deferred-action gas generator. In that form, evacuated container 70 encloses deferred-action battery 72 that has leads 74 emerging through hermetically sealed insulators 76. Tube 78 encloses suitable perforating mechanism to allow water to fill the container upon immersion of the tube. The gas generator includes the effervescent compound 80 in a compartment 82 sealed to the bottom of the container. With this arrangement, the container will fill, and the battery separators will be soaked. The water will spill into compartment 82; and the free water that might short-circuit the battery will then be forced out through tube 78. The water retained in compartment 82 will maintain operation of the gas generator after the liquid level drops; and the free liquid that might short-circuit the battery is thus entirely expelled. The compartment retains the dissolved salts produced in generating the gas, so that the possibility of damage to the battery by such reaction products need not be considered in selecting the gas-evolving materials.

Another possible source of gas broadly alternative to the gas generators shown is a capsule of compressed gas with a mechanism for deferring its release, such as a water-soluble plug in the capsule wall. Other detailed modifications, and varied uses for the novel deferred-action assembly and its features severally will occur to those skilled in the art; therefore the appended claims should be given broad interpretation consistent with the spirit and scope of the invention.

What is claimed is:

1. A deferred-action battery assembly comprising a container, a deferred-action battery within said container, means for admitting activating liquid to the container, and a deferred-action source of gas external of said battery and within said container to expel free liquid.

2. A deferred-action battery assembly comprising an evacuated container, a deferred-action battery within said container, a deferred-action gas generator in said container, and an automatic mechanism for breaching said container upon immersion in liquid to activate said battery and said generator, the free cell-activating liquid being expelled from said container by the generated gas.

3. A deferred-action battery assembly comprising a partly evacuated container, a deferred-action battery comprising plural cells stacked one against another within said container, said cells having edge portions exposed for application of activating liquid, and a deferred-action gas generator within said container to expel excess liquid after activation.

4. A deferred-action battery in accordance with claim 3 wherein a water-repellent electrical barrier is provided on surfaces of adjacent electrodes.

5. A deferred-action battery assembly including an airtight evacuated container, a water-activated battery enclosed in said container in a manner to provide access space for admission of activating liquid to the battery, and a compartment external of said battery and containing effervescent material that evolves gas during reaction with water, said compartment and the access space being connected by a passage enabling concurrent activation of said battery and the wetting of said effervescent material upon immersion of said evacuated container in water and puncture of a lower part thereof, said passage also enabling the gas then yielded by said effervescent material to reach the access space of the battery and to expell excess liquid from that space.

6. In combination, an at least partially evacuated container adapted to be perforated, a stack of liquid-activated cells enclosed in said container, automatic means attached to a lower external portion of said container for providing an opening in the lower portion of said container, said means including a barb having a spring biasing the barb toward the container and a water-weakened element restraining said barb prior to immersion in water and a liquid-activated gas generator having a communicating space extending to said cell and arranged to expel excess activating liquid after activation of said cells.

7. A deferred-action battery assembly comprising a normally fluid-impervious enclosure, a deferred-action battery within the enclosure and having interelectrode spaces adapted to receive and retain liquid to activate the battery when such liquid is admitted to the enclosure, and a deferred-action source of gas opening into said enclosure to expel the free liquid within the enclosure from the space about the battery.

8. A deferred-action battery assembly comprising a partly evacuated container, a deferred-action battery comprising plural cells stacked one against another within said container, said battery having plural interelectrode spaces for receiving and retaining activating liquid and having edge portions exposed for admission of the liquid, and a deferred-action gas generator opening into said container to expel excess liquid from said edge portions after activation, without, however, expelling the liquid from the interelectrode spaces of the battery.

9. A deferred-action battery assembly, comprising an airtight evacuated container enclosing a water-activated battery, said battery comprising multiple interelectrode spaces for receiving activating liquid, said battery having openings to said interelectrode spaces through which the liquid is admissible, and a compartment within and opening into said container and containing effervescent material that evolves gas during reaction with the water.

10. In combination, a container, a liquid-activated cell enclosed in said container, and a liquid-activated gas generator in said container external of but communicating with said cell and having means for maintaining action of the gas generator after the start of expulsion of activating liquid.

11. A deferred-action electrical source comprising a vacuum container, a deferred-action cell in said container, means to perforate said container upon contact with water, and automatic gas-evolving means for expelling excess activating liquid after its admission into said container.

12. A deferred-action battery assembly comprising a plurality of series-connected cells, each cell having a pair of electrodes, separated by a dry interelectrode spacer, said spaced having an externally accessible portion for admission of activating liquid, the portions of the electrodes adjacent to the accessible portion of said spacer having a water-repellent surface, and a container enclosing said battery, whereby admission of aqueous activating liquid to the container will activate the battery, and a gas source arranged to discharge gas into the space about the battery, said source being external of the battery and being activated upon admission of the liquid to the container for expelling liquid from about the battery after activation.

13. A deferred-action battery assembly comprising a plurality of series-connected cells, each cell having a pair of electrodes separated by a dry interelectrode spacer that is provided with an access passage for admission of aqueous activating liquid, and an evacuated container enclosing said battery whereby the spacer is also evacuated, the foregoing arrangement being effective to activate the battery upon admission of the liquid to the container, and a gas source external of the battery but arranged to discharge gas into the space about the battery, said gas source being activated upon admission of liquid to the container for expelling excess liquid from about the battery after activation thereof.

JAMES N. DAVIS.

REFERENCES CITED

The following references are of record in the file of this patent:

UNITED STATES PATENTS

| Number | Name | Date |
| --- | --- | --- |
| 1,218,847 | Firey | Mar. 13, 1917 |
| 1,310,586 | Straub et al. | July 22, 1919 |
| 1,401,671 | Chubb | Dec. 27, 1921 |
| 1,509,209 | Huntley | Sept. 23, 1924 |
| 1,566,927 | Rosen | Dec. 22, 1925 |
| 1,815,508 | Heise et al. | July 21, 1931 |
| 2,144,574 | MacCallum | Jan. 19, 1939 |
| 2,404,144 | Riggs et al. | July 16, 1946 |
| 2,433,024 | Burgess | Dec. 23, 1947 |
| 2,441,896 | Moir | May 18, 1948 |

FOREIGN PATENTS

| Number | Country | Date |
| --- | --- | --- |
| 17,269 | Great Britain | of 1895 |
| 336,844 | Great Britain | Oct. 23, 1930 |